United States Patent
Onishi et al.

(10) Patent No.: US 11,486,852 B2
(45) Date of Patent: Nov. 1, 2022

(54) GAS SENSOR ELEMENT AND GAS SENSOR

(71) Applicant: NGK INSULATORS, LTD., Aichi (JP)

(72) Inventors: Ryo Onishi, Iwakura (JP); Yusuke Watanabe, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 248 days.

(21) Appl. No.: 16/795,806

(22) Filed: Feb. 20, 2020

(65) Prior Publication Data

US 2020/0271618 A1    Aug. 27, 2020

(30) Foreign Application Priority Data

Feb. 26, 2019    (JP) .............................. JP2019-033351

(51) Int. Cl.
    *G01N 27/407*    (2006.01)
(52) U.S. Cl.
    CPC ..... *G01N 27/4071* (2013.01); *G01N 27/4074* (2013.01); *G01N 27/4077* (2013.01)
(58) Field of Classification Search
    CPC ........... G01N 27/4071; G01N 27/4074; G01N 27/4077; G01N 27/409; G01N 27/301; G01N 27/4162; G01N 27/406–41; G01N 33/0004–0075
    See application file for complete search history.

(56) References Cited

U.S. PATENT DOCUMENTS

| | | | | |
|---|---|---|---|---|
| 5,124,021 A | * | 6/1992 | Kaneyasu | G01N 27/417 204/426 |
| 5,849,165 A | * | 12/1998 | Kojima | G01N 27/4075 204/429 |
| 9,512,770 B2 | * | 12/2016 | Oya | F02B 37/18 |

(Continued)

FOREIGN PATENT DOCUMENTS

| | | |
|---|---|---|
| JP | 2012-93330 A | 5/2012 |
| JP | 2012168030 A * | 9/2012 |

(Continued)

OTHER PUBLICATIONS

Waldron (P. Waldron, Surface Roughness Comparison, downloaded from https://edmprecision.com/surface-roughness-comparison/ on Feb. 2, 2022) (Year: 2022).*

(Continued)

*Primary Examiner* — Joshua L Allen
(74) *Attorney, Agent, or Firm* — Mattingly & Malur, PC (57) ABSTRACT

A sensor element is used to detect the concentration of a predetermined component in a gas. The sensor element includes a sensor element body including a solid-state-electrolyte layer having oxygen-ion conductivity, an outer pump electrode that is disposed on an upper surface, which is one of the surfaces, of the sensor element body, and a porous protective layer that is provided so as to cover at least the outer pump electrode. A spatial layer is provided between the porous protective layer and the sensor element body. The spatial layer includes a first spatial layer between (Continued)

the porous protective layer and the outer pump electrode. The maximum-height roughness Rz of a region of the inner surface of the porous protective layer, the region facing the outer pump electrode, is 50 µm or smaller.

8 Claims, 6 Drawing Sheets

(56) References Cited

U.S. PATENT DOCUMENTS

| | | | | | |
|---|---|---|---|---|---|
| 2008/0035480 | A1* | 2/2008 | Cramer | ............... | G01N 27/4071 |
| | | | | | 204/424 |
| 2011/0094883 | A1* | 4/2011 | Ito | ...................... | G01N 27/4077 |
| | | | | | 204/429 |
| 2011/0186431 | A1* | 8/2011 | Horisaka | ............ | G01N 27/4077 |
| | | | | | 156/89.12 |
| 2012/0211362 | A1* | 8/2012 | On | ..................... | G01N 27/4077 |
| | | | | | 204/424 |
| 2012/0248071 | A1 | 10/2012 | Ikoma | | |
| 2014/0291150 | A1* | 10/2014 | Otsuka | ............... | G01N 27/4077 |
| | | | | | 204/424 |
| 2016/0282298 | A1* | 9/2016 | Hino | .................. | G01N 33/0036 |
| 2017/0343505 | A1* | 11/2017 | Ito | ...................... | G01N 27/4072 |

FOREIGN PATENT DOCUMENTS

| | | |
|---|---|---|
| JP | 2012-210637 A | 11/2012 |
| JP | 2016-65853 A | 4/2016 |
| JP | 2016-188853 A | 11/2016 |

OTHER PUBLICATIONS

Kato et al. (JP 2012168030 A, machine translation) (Year: 2012).*
Japanese Office Action received in corresponding Japanese Application No. 2019-033351 dated Jul. 12, 2022.

* cited by examiner

Gas flowing portion

Fig. 10

GAS SENSOR ELEMENT AND GAS SENSOR

CROSS-REFERENCE TO RELATED APPLICATION

The present application claims priority over Japanese Patent Application No. 2019-033351, filed on Feb. 26, 2019, the entire contents of which are incorporated herein by reference.

BACKGROUND OF THE INVENTION

1. Field of the Invention

The present invention relates to a gas sensor element and a gas sensor.

2. Description of the Related Art

To date, gas sensors each including a sensor element for detecting the concentration of a predetermined component such as NOx in a measurement-object gas that is automobile exhaust gas or the like are known. PTL 1 discloses an example of gas sensors of this type in which a porous protective layer is provided so as to cover an outer electrode disposed on a surface of the sensor element and in which a spatial layer is provided between the porous protective layer and the outer electrode. It is described that, because the spatial layer can impede heat conduction in the thickness direction of the porous protective layer, cooling of the sensor element when water adheres to a surface of the porous protective layer is suppressed and the water resistance of the gas sensor is improved.

CITATION LIST

Patent Literature

PTL 1: JP 2016-188853 A

SUMMARY OF THE INVENTION

Because such a gas sensor has a high temperature (for example, 800° C.) during a normal operation, it is desirable to further suppress cracking of the sensor element when the gas sensor rapidly cools due to adhesion of water.

The present invention has been made to solve such a problem, and an object thereof is to improve the water resistance of a gas sensor element.

A gas sensor element according to the present invention is a gas sensor element for detecting a concentration of a predetermined component in a gas. The gas sensor element includes an element body including a solid electrolyte layer having oxygen-ion conductivity, a predetermined portion that is a portion at a surface of the element body and that has a high temperature during use, a porous protective layer that is provided so as to cover at least the predetermined portion, and a first spatial layer that is provided between the porous protective layer and the predetermined portion. A maximum-height roughness Rz of a region of an inner surface of the porous protective layer, the region facing the predetermined portion, is 50 μm or less.

In the gas sensor element, the porous protective layer is provided so as to cover the predetermined portion of the surface of the element body, and the first spatial layer is provided between the porous protective layer and the predetermined portion. Thus, the first spatial layer impedes heat conduction in the thickness direction of the porous protective layer. Therefore, cooling of the element body when water adheres to the porous protective layer is suppressed. Moreover, the maximum-height roughness Rz of the region of the inner surface (surface on the element body side) of the porous protective layer, the region facing the predetermined portion, is 50 μm or less, and the region is a smooth surface. Therefore, heat radiated from the predetermined portion of the element body is reflected by the inner surface of the porous protective layer and easily returns to the element body, and high temperature-maintaining effect can be obtained. Accordingly, the water resistance of the gas sensor is improved.

When the maximum-height roughness of the region of the inner surface of the porous protective layer, the region facing the predetermined portion, exceeds 50 μm, the surface area of the region increases, and therefore heat radiated from the element body is absorbed by the porous protective layer and does not easily returns to the element body. Therefore, the temperature-maintaining effect of the element body cannot be sufficiently obtained.

In the gas sensor element according to the present invention, preferably, the maximum-height roughness Rz of the region of the inner surface of the porous protective layer, the region facing the predetermined portion, is 40 μm or less. In this case, because the aforementioned temperature-maintaining effect is further increased, the water resistance of the element body is further improved.

In the gas sensor element according to the present invention, preferably, a thickness variation of the first spatial layer is 20% or less. Although the heat-insulating ability of the first spatial layer is dependent on the thickness of the first spatial layer, heat-insulating ability does not considerably differ between a thick part and a thin part of the first spatial layer, provided that the thickness variation is 20% or less. The term "thickness variation" refers to the variation in the thickness in a direction perpendicular to the first surface. The thickness of the first spatial layer, which is not particularly limited, may be 10 μm or more and 200 μm or less, and more preferably, 50 μm or more and 100 μm or less.

In the gas sensor element according to the present invention, the solid electrolyte layer is preferably a zirconia layer, and the porous protective layer is preferably a porous alumina layer.

In the gas sensor element according to the present invention, the predetermined portion may be an outer electrode that is one of a group of electrodes that are used to detect the predetermined component by using the oxygen-ion conductivity of the solid electrolyte layer. Because the outer electrode is a portion that tends to have a high temperature and where cracking tends to occur during use, the outer electrode is significant for improving the water resistance. In the gas sensor element, the element body may have an elongated rectangular-parallelepiped shape, the group of electrodes may be provided in a distal end portion of the element body, the distal end portion including an end surface of the element body in a longitudinal direction, the porous protective layer may be provided so as to cover a surface of the distal end portion, and a spatial layer including the first spatial layer may be present between the porous protective layer and the surface of the distal end portion. In this case, the porous protective layer covers, with the spatial layer therebetween, the surface of the distal end portion of the sensor element body in which a group of electrodes (including the outer electrode) that are used to detect a predetermined component by utilizing the oxygen-ion conductivity of the solid electrolyte layer are provided. Therefore, the water resistance of the distal end portion, which performs an important function in detection of a predetermined component, is improved.

In the gas sensor element according to the present invention, the predetermined portion may be a portion that is a projection of a gas flowing portion onto the surface of the element body, the gas flowing portion being a space through which the gas is taken into the element body from an outside space. Because the portion that is a projection of the gas flowing portion onto the surface of the element body is a portion that tends to have a high temperature and where cracking tends to occur during use, the portion is significant for improving the water resistance. The outer electrode may be included in the portion that is a projection of the gas flowing portion onto the surface of the element body.

A gas sensor according to the present invention includes the gas sensor element according to any one of the aspects described above. Therefore, the gas sensor has the same advantages as the gas sensor element according to the present invention described above, such as the water resistance of the gas sensor element is improved. A gas sensor according to the present invention may include a fixing member that fixes the gas sensor element and a protective cover that covers one end of the gas sensor element in the longitudinal direction.

BRIEF DESCRIPTION OF THE DRAWINGS

FIG. 8 is a sectional view illustrating a state in which a spatial layer 93 has been formed due to the thermal-expansion difference between the porous protective layer 91 and the sensor element body 101a.

FIG. 9 is a sectional view illustrating a portion that is a projection of a gas flowing portion onto a surface of the sensor element body 101a.

DETAILED DESCRIPTION OF THE INVENTION

Figure 1:
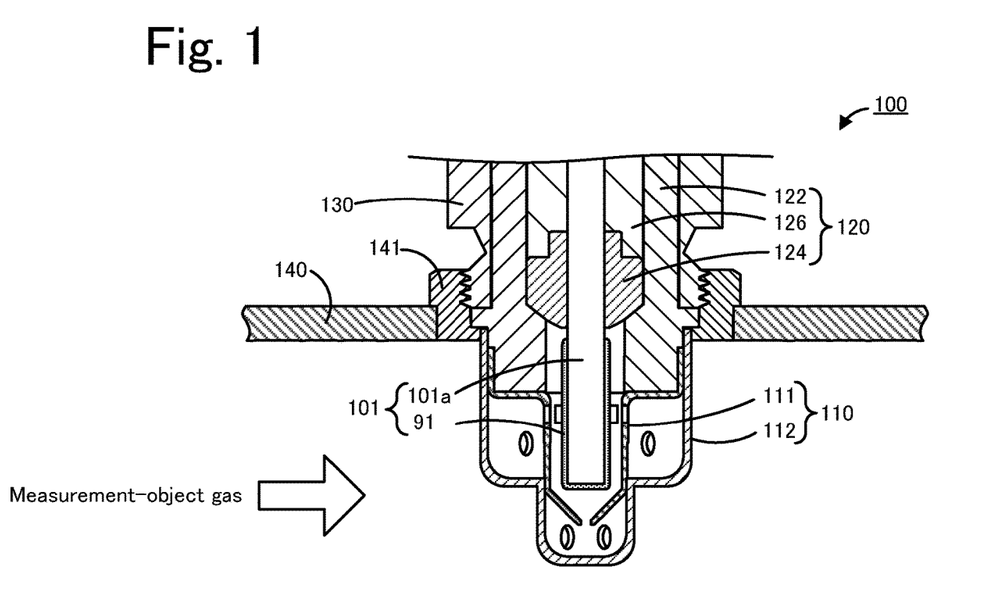
FIG. 1 is a longitudinal sectional view of a gas sensor 100.
Figure 2:
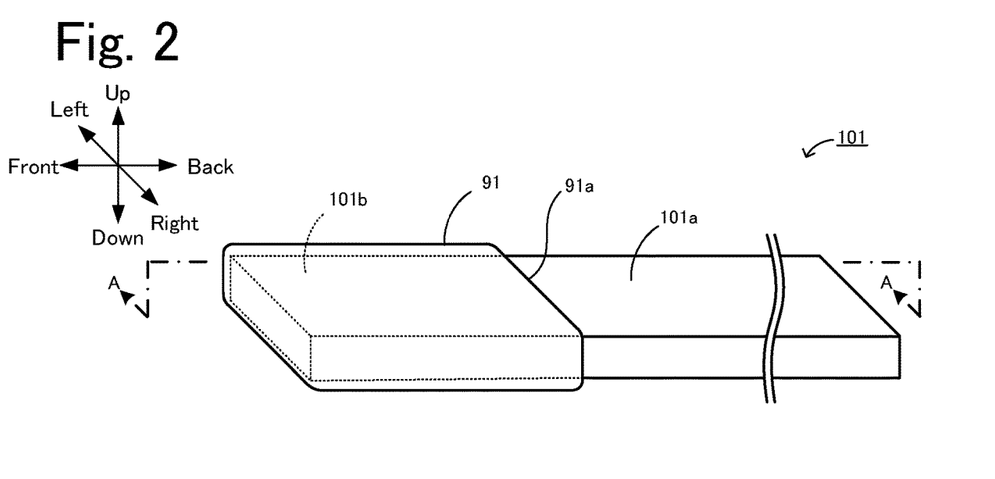
FIG. 2 is a perspective view schematically illustrating an example of the structure of a sensor element 101.
Figure 3:
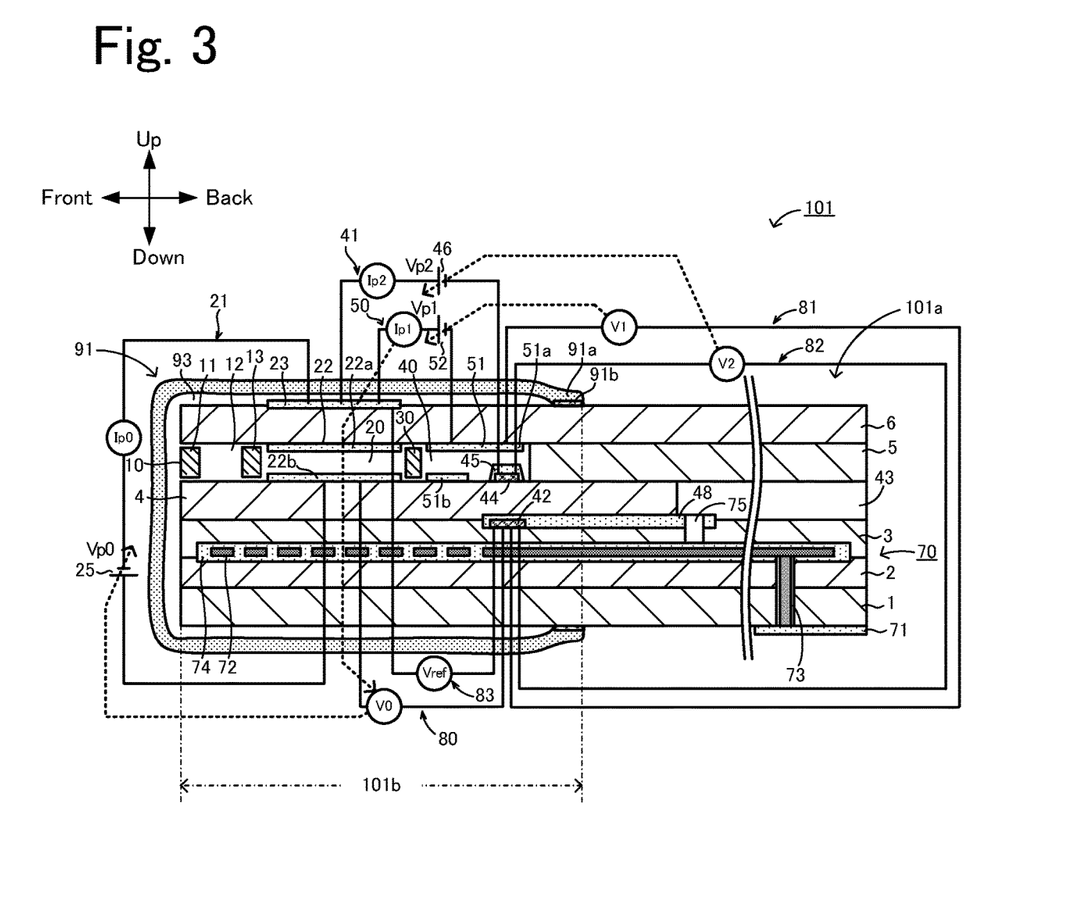
FIG. 3 is a sectional view taken along line A-A in FIG. 2.
Figure 4:
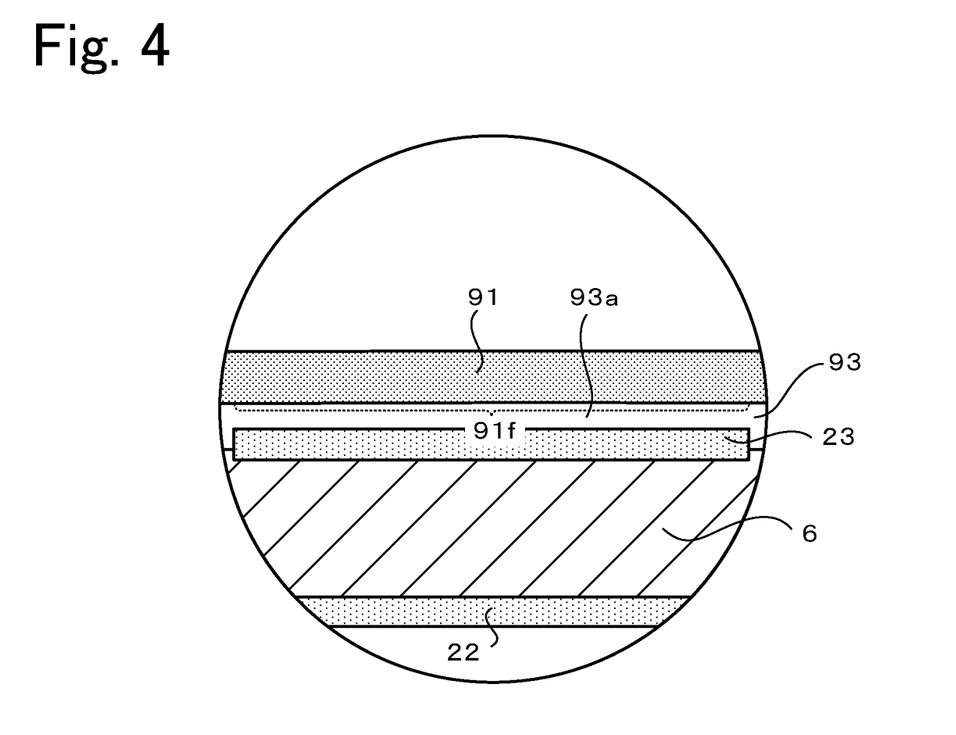
FIG. 4 is a partial enlarged view of FIG. 3.
Figure 5:
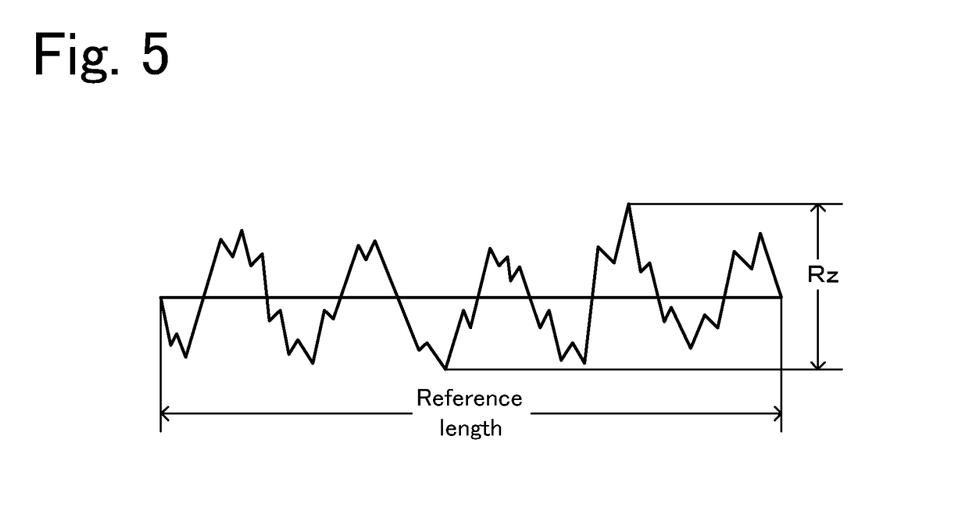
FIG. 5 illustrates maximum-height roughness Rz.

An embodiment of the present invention will be described with reference to the drawings. FIG. 1 is a longitudinal sectional view of a gas sensor 100 according to an embodiment of the present invention. FIG. 2 is a perspective view schematically illustrating an example of the structure of a sensor element 101. FIG. 3 is a sectional view taken along line A-A in FIG. 2. FIG. 4 is a partial enlarged view of FIG. 3. FIG. 5 illustrates maximum-height roughness Rz. The structure of the gas sensor 100 illustrated in FIG. 1 is known and is described, for example, in JP 2012-210637 A.

The gas sensor 100 includes the sensor element 101, a protective cover 110 that covers and protects one end of the sensor element 101 in the longitudinal direction (the lower end in FIG. 1), an element sealing member 120 that seals and fixes the sensor element 101, and a nut 130 attached to the element sealing member 120. As illustrated in FIG. 1, the gas sensor 100 is attached, for example, to a pipe 140 such as a vehicle-exhaust-gas pipe, and is used to measure the concentration of a specific gas (NOx in the present embodiment) included in the exhaust gas as a measurement-object gas. The sensor element 101 includes a sensor element body 101a, and a porous protective layer 91 that covers the sensor element body 101a.

The protective cover 110 includes an inner protective cover 111 that has a bottomed-tubular shape and covers one end of the sensor element 101, and an outer protective cover 112 that has a bottomed-tubular shape and covers the inner protective cover 111. In each of the inner protective cover 111 and the outer protective cover 112, a plurality of holes, through which a measurement-object gas can flow into the protective cover 110, are formed. The one end of the sensor element 101 is disposed in a space surrounded by the inner protective cover 111.

The element sealing member 120 includes a cylindrical metal shell 122, a ceramic supporter 124 that is tightly fitted into a through-hole in the metal shell 122, and a compact 126 that is formed of ceramic powder such a talc and that is tightly fitted into the through-hole in the metal shell 122. The sensor element 101 is located on the central axis of the element sealing member 120 and extends through the element sealing member 120 in the front-back direction. The compact 126 is compressed between the metal shell 122 and the sensor element 101. Thus, the compact 126 seals the through-hole in the metal shell 122 and fixes the sensor element 101.

The nut 130 is fixed so as to be coaxial with the metal shell 122 and has an externally-threaded portion formed on the outer peripheral surface thereof. The externally-threaded portion of the nut 130 is inserted into an attachment member 141 that is welded to the pipe 140 and that has an internally-threaded portion formed in the inner peripheral surface thereof. Thus, the gas sensor 100 can be fixed to the pipe 140 in a state in which one end of the sensor element 101 and a part of the protective cover 110 protrude into the pipe 140.

As illustrated in FIGS. 2 and 3, the sensor element 101 has an elongated rectangular-parallelepiped shape. Hereafter, the sensor element 101 will be described in detail. For convenience of description, the longitudinal direction of the sensor element 101 will be referred to as the front-back direction, the thickness direction of the sensor element 101 will be referred to as the up-down direction, and the width direction of the sensor element 101 will be referred to as the left-right direction.

As illustrated in FIG. 3, the sensor element 101 has a structure in which a first substrate layer 1, a second substrate layer 2, a third substrate layer 3, a first solid electrolyte layer 4, a spacer layer 5, and a second solid electrolyte layer 6 are stacked in order from the lower side in FIG. 3. These six layers are each an oxygen-ion-conductive solid electrolyte layer made of zirconia ($ZrO_2$) or the like. The solid electrolyte layer of these six layers is dense and hermetic. The sensor element 101 is manufactured, for example, by performing predetermined processing and printing of a circuit pattern and the like on ceramic green sheets corresponding to the layers, stacking the ceramic green sheets, and firing the ceramic green sheets to integrate these.

In a distal end portion (end portion in the front direction) of the sensor element 101 between the lower surface of the second solid electrolyte layer 6 and the upper surface of the first solid electrolyte layer 4, a gas inlet opening 10, a first diffusion-rate-determining portion 11, a buffer space 12, a second diffusion-rate-determining portion 13, a first internal space 20, a third diffusion-rate-determining portion 30, and a second internal space 40 are formed so as to communicate with and adjacent to each other in this order.

The gas inlet opening 10, the buffer space 12, the first internal space 20, and the second internal space 40 are spaces in the sensor element 101 each of which is formed as a hollow in the spacer layer 5 and each of which has an upper part defined by the lower surface of the second solid electrolyte layer 6, a lower part defined by the upper surface of the first solid electrolyte layer 4, and a side part defined by the side surface of the spacer layer 5.

The first diffusion-rate-determining portion 11, the second diffusion-rate-determining portion 13, and the third diffusion-rate-determining portion 30 are each formed as two laterally-elongated slits (an opening of each of which has a longitudinal direction perpendicular to the plane of FIG. 3). A portion extending from the gas inlet opening 10 to the second internal space 40 will be referred to as a "gas flowing portion".

At a position farther than the gas flowing portion from the distal end side, a reference-gas inlet space 43 is provided, between the upper surface of the third substrate layer 3 and the lower surface of the spacer layer 5, at a position such that a side part thereof is defined by the side surface of the first solid electrolyte layer 4. To the reference-gas inlet space 43, for example, air is introduced as a reference gas that is used when measuring NOx concentration.

An air inlet layer 48 is a layer made of porous ceramics. To the air inlet layer 48, the reference gas is introduced through the reference-gas inlet space 43. The air inlet layer 48 is formed so as to cover a reference electrode 42.

The reference electrode 42 is formed in such a way as to be interposed between the upper surface of the third substrate layer 3 and the first solid electrolyte layer 4. As described above, the air inlet layer 48, which is connected to the reference-gas inlet space 43, is provided around the reference electrode 42. As described below, by using the reference electrode 42, it is possible to measure the oxygen concentration (oxygen partial pressure) in the first internal space 20 and in the second internal space 40.

In the gas flowing portion, the gas inlet opening 10 opens toward the outside space. Through the gas inlet opening 10, a measurement-object gas is taken into the sensor element 101 from the outside space. The first diffusion-rate-determining portion 11 applies a predetermined diffusion resistance to the measurement-object gas taken into the sensor element 101 through the gas inlet opening 10. The buffer space 12 is a space for guiding the measurement-object gas, which is introduced from the first diffusion-rate-determining portion 11, toward the second diffusion-rate-determining portion 13. The second diffusion-rate-determining portion 13 is a portion that applies a predetermined diffusion resistance to the measurement-object gas introduced into the first internal space 20 from the buffer space 12. The measurement-object gas is introduced from the outside of the sensor element 101 into the first internal space 20 as follows: the measurement-object gas is rapidly taken into the sensor element 101 from the gas inlet opening 10 due to the pressure fluctuation of the measurement-object gas (pulsation of exhaust gas pressure when the measurement-object gas is automobile exhaust gas) in the outside space; then, the measurement-object gas is not directly introduced into the first internal space 20 but is introduced into the first internal space 20 after the pressure fluctuation of the measurement-object gas is cancelled out while passing through the first diffusion-rate-determining portion 11, the buffer space 12, and the second diffusion-rate-determining portion 13. Thus, the pressure fluctuation of the measurement-object gas introduced into the first internal space 20 becomes almost negligible. The first internal space 20 is provided as a space for adjusting the oxygen partial pressure in the measurement-object gas introduced through the second diffusion-rate-determining portion 13. The oxygen partial pressure is adjusted as a main pump cell 21 operates.

The main pump cell 21 is an electrochemical pump cell that is constituted by the following elements: an inner pump electrode 22 having a top electrode portion 22a that is provided on substantially the entirety of the lower surface of the second solid electrolyte layer 6 facing the first internal space 20; an outer pump electrode 23 (corresponding to a predetermined portion and an outer electrode in the present invention) that is provided on a region of the upper surface of the second solid electrolyte layer 6 corresponding to the top electrode portion 22a so as to be exposed to the outside space; and the second solid electrolyte layer 6 interposed between these electrodes. The outer pump electrode 23 is provided on the upper surface of the sensor element body 101a.

The inner pump electrode 22 is formed on upper and lower solid electrolyte layers (the second solid electrolyte layer 6 and the first solid electrolyte layer 4) that define the first internal space 20 and on the spacer layer 5 that provides a side wall. To be specific, the top electrode portion 22a is formed on the lower surface of the second solid electrolyte layer 6, which provides a top surface of the first internal space 20; a bottom electrode portion 22b is formed on the upper surface of the first solid electrolyte layer 4, which provides a bottom surface of the first internal space 20; side electrode portions (not shown) are formed on side wall surfaces (inner surfaces) of the spacer layer 5 that form both wall portions of the first internal space 20 so as to connect the top electrode portion 22a and the bottom electrode portion 22b; and the inner pump electrode 22 is disposed in a structure that has a tunnel-like shape at the position of the side electrode portions in a tunnel-shaped structure.

The inner pump electrode 22 and the outer pump electrode 23 are each formed as a porous cermet electrode (for example, a cermet electrode of Pt and $ZrO_2$ including 1% of Au). The inner pump electrode 22, which contacts the measurement-object gas, is made of a material whose reducing ability against NOx component in the measurement-object gas is weakened.

With the main pump cell 21, it is possible to pump oxygen in the first internal space 20 to the outside space or to pump oxygen in the outside space into the first internal space 20 by applying a desirable pump voltage Vp0 between the inner pump electrode 22 and the outer pump electrode 23 and causing a pump electric current Ip0 to flow between the inner pump electrode 22 and the outer pump electrode 23 in the positive direction or in the negative direction.

In order to detect the oxygen concentration (oxygen partial pressure) in the atmosphere in the first internal space 20, an electrochemical sensor cell, that is, an oxygen-partial-pressure sensor cell 80 for main pump control is constituted by the following elements: the inner pump electrode 22; the second solid electrolyte layer 6; the spacer layer 5; the first solid electrolyte layer 4; the third substrate layer 3; and the reference electrode 42.

By measuring the electromotive force V0 in the oxygen-partial-pressure sensor cell 80 for main pump control, the oxygen concentration (oxygen partial pressure) in the first internal space 20 can be detected. Moreover, by performing feedback control on the pump voltage Vp0 of a variable electric power source 25 so that the electromotive force V0 becomes constant, the pump electric current Ip0 is controlled. Thus, the oxygen concentration in the first internal space can be maintained at a predetermined constant value.

The third diffusion-rate-determining portion 30 is a portion that applies a predetermined diffusion resistance to the measurement-object gas, whose oxygen concentration (oxygen partial pressure) has been controlled in the first internal space 20 as the main pump cell 21 operates, and guides the measurement-object gas to the second internal space 40.

The second internal space 40 is a space for performing an operation related to measurement of the nitrogen oxide (NOx) concentration in the measurement-object gas introduced through the third diffusion-rate-determining portion 30. Measurement of the NOx concentration is mainly performed in the second internal space 40, whose oxygen concentration has been adjusted by an auxiliary pump cell 50, as a measurement pump cell 41 operates.

In the second internal space 40, adjustment of oxygen partial pressure is further performed, by using the auxiliary pump cell 50, on the measurement-object gas whose oxygen concentration (oxygen partial pressure) has been adjusted beforehand in the first internal space 20 and that has been introduced through the third diffusion-rate-determining portion 30. Thus, the oxygen concentration in the second internal space 40 can be maintained constant with high precision, and the gas sensor 100 can perform high-precision NOx measurement concentration.

The auxiliary pump cell 50 is an auxiliary electrochemical pump cell that is constituted by the following elements: an auxiliary pump electrode 51 having a top electrode portion 51a that is provided on substantially the entirety of the lower surface of the second solid electrolyte layer 6 facing the second internal space 40; the outer pump electrode 23 (which is not limited to the outer pump electrode 23 and may be any appropriate electrode on the outer side of the sensor element 101); and the second solid electrolyte layer 6.

The auxiliary pump electrode 51 is disposed in the second internal space 40 in a tunnel-shaped structure similar to the inner pump electrode 22 provided in the first internal space 20. That is, the tunnel-shaped structure is as follow: the top electrode portion 51a is formed on the second solid electrolyte layer 6, which provides a top surface of the second internal space 40; a bottom electrode portion 51b is formed on the first solid electrolyte layer 4, which provides a bottom surface of the second internal space 40; and side electrode portions (not shown) are formed on both side walls of the spacer layer 5 that provide side walls of the second internal space 40 so as to couple the top electrode portion 51a and the bottom electrode portion 51b. As with the inner pump electrode 22, the auxiliary pump electrode 51 is also made of a material whose reducing ability against NOx component in the measurement-object gas is weakened.

With the auxiliary pump cell 50, it is possible to pump oxygen in the atmosphere in the second internal space 40 to the outside space or to pump oxygen in the outside space into the second internal space 40 by applying a desirable pump voltage Vp1 between the auxiliary pump electrode 51 and the outer pump electrode 23.

In order to control the oxygen partial pressure in the atmosphere in the second internal space 40, an electrochemical sensor cell, that is, an oxygen-partial-pressure sensor cell 81 for auxiliary pump control is constituted by the following elements: the auxiliary pump electrode 51; the reference electrode 42; the second solid electrolyte layer 6; the spacer layer 5; the first solid electrolyte layer 4; and the third substrate layer 3.

The auxiliary pump cell 50 performs pumping by using a variable electric power source 52, whose voltage is controlled on the basis of an electromotive force V1 detected by the oxygen-partial-pressure sensor cell 81 for auxiliary pump control. Thus, the oxygen partial pressure in the atmosphere in the second internal space 40 is controlled to a low partial pressure that has substantially no influence on NOx measurement.

Moreover, the pump electric current Ip1 is used to control the electromotive force of the oxygen-partial-pressure sensor cell 80 for main pump control. To be specific, the pump electric current Ip1 is input to the oxygen-partial-pressure sensor cell 80 for main pump control as a control signal, and, as the electromotive force V0 is controlled, the gradient of the oxygen partial pressure in the measurement-object gas introduced from the third diffusion-rate-determining portion 30 into the second internal space 40 is controlled to be constant. When the gas sensor 100 is used as a NOx sensor, due to the functions of the main pump cell 21 and the auxiliary pump cell 50, the oxygen concentration in the second internal space 40 is maintained at a constant value of about 0.001 ppm.

The measurement pump cell 41 measures the NOx concentration in the measurement-object gas in the second internal space 40. The measurement pump cell 41 is an electrochemical pump cell that is constituted by the following elements: a measurement electrode 44 that is provided at a position that is on an upper surface of the first solid electrolyte layer 4 facing the second internal space 40 and that is separated from the third diffusion-rate-determining portion 30; the outer pump electrode 23; the second solid electrolyte layer 6; the spacer layer 5; and the first solid electrolyte layer 4.

The measurement electrode 44 is a porous cermet electrode. The measurement electrode 44 functions also as a NOx reduction catalyst that reduces NOx in the atmosphere in the second internal space 40. Moreover, the measurement electrode 44 is covered by a fourth diffusion-rate-determining portion 45.

The fourth diffusion-rate-determining portion 45 is a film made of a porous ceramic material. The fourth diffusion-rate-determining portion 45 serves to limit the amount of NOx that flows into the measurement electrode 44 and also functions as a protective film of the measurement electrode 44. The measurement pump cell 41 can pump out oxygen that is generated due to decomposition of nitrogen oxides in the atmosphere around the measurement electrode 44 and can detect the amount of the generated oxygen as a pump electric current Ip2.

In order to detect the oxygen partial pressure around the measurement electrode 44, an electrochemical sensor cell, that is, an oxygen-partial-pressure sensor cell 82 for measurement pump control is constituted by the following elements: the first solid electrolyte layer 4; the third substrate layer 3; the measurement electrode 44; and the reference electrode 42. A variable electric power source 46 is controlled on the basis of an electromotive force V2 detected by the oxygen-partial-pressure sensor cell 82 for measurement pump control.

A measurement-object gas introduced into the second internal space 40 reaches the measurement electrode 44 through the fourth diffusion-rate-determining portion 45 under a condition in which the oxygen partial pressure is controlled. Nitrogen oxide in the measurement-object gas around the measurement electrode 44 is reduced and generates oxygen ($2NO \rightarrow N_2 + O_2$). When the generated oxygen is pumped by the measurement pump cell 41, the voltage Vp2 of the variable electric power source 46 is controlled so that the control voltage V2 detected by the oxygen-partialpressure sensor cell 82 for measurement pump control becomes constant. The amount of oxygen generated around the measurement electrode 44 is proportional to the concentration of nitrogen oxide in a measurement-object gas. Therefore, the nitrogen oxide concentration in the measurement-object gas is calculated by using the pump electric current Ip2 of the measurement pump cell 41.

By configuring an oxygen-partial-pressure detecting device as an electrochemical sensor cell including a combination of the measurement electrode 44, the first solid electrolyte layer 4, the third substrate layer 3, and the reference electrode 42, it is possible to detect an electromotive force in accordance with the difference between the amount of oxygen generated by reduction of a NOx component in the atmosphere around the measurement electrode 44 and the amount of oxygen included in the reference air. Thus, the concentration of a NOx component in a measurement-object gas can be obtained by using the electromotive force.

Moreover, an electrochemical sensor cell 83 is constituted by the second solid electrolyte layer 6, the spacer layer 5, the first solid electrolyte layer 4, the third substrate layer 3, the outer pump electrode 23, and the reference electrode 42. By using an electromotive force Vref obtained by the sensor cell 83, the oxygen partial pressure in the measurement-object gas outside the sensor can be detected.

In the gas sensor 100 having such a configuration, a measurement-object gas whose oxygen partial pressure is maintained at a low constant value (a value that has substantially no influence on NOx measurement) by operating the main pump cell 21 and the auxiliary pump cell 50 is provided to the measurement pump cell 41. Accordingly, the gas sensor 100 can detect the NOx concentration in the measurement-object gas on the basis of the pump electric current Ip2 that flows, substantially proportionally to the NOx concentration in the measurement-object gas, as oxygen generated by reduction of NOx is pumped out by the measurement pump cell 41.

Moreover, in order to increase the oxygen-ion conductivity of the solid electrolyte, the sensor element 101 includes a heater unit 70 that serves to heat the sensor element 101 and to keep the temperature of the sensor element 101. The heater unit 70 includes a heater connector electrode 71, a heater 72, a through hole 73, a heater insulation layer 74, and a pressure diffusion hole 75.

The heater connector electrode 71 is formed so as to be in contact with the lower surface of the first substrate layer 1. By connecting the heater connector electrode 71 to an external power source, electricity can be supplied from the outside to the heater unit 70.

The heater 72 is a resistor that is interposed between the second substrate layer 2 and the third substrate layer 3 in the up-down direction. The heater 72 is connected to the heater connector electrode 71 via the through hole 73. The heater 72 generates heat by receiving electricity from the outside through the heater connector electrode 71, thereby heating and keeping the temperature of the solid electrolyte that forms the sensor element 101.

The heater 72 is embedded in the entire area from the first internal space 20 to the second internal space 40, and can adjust the temperature of the entirety of the sensor element 101 to a temperature at which the solid electrolyte is activated.

The heater insulation layer 74 is an insulation layer that is made of an insulating material such as alumina and that is formed on the upper and lower surfaces of the heater 72. The heater insulation layer 74 is formed in order to obtain electrical insulation between the second substrate layer 2 and the heater 72 and electric insulation between the third substrate layer 3 and the heater 72.

The pressure diffusion hole 75 extends through the third substrate layer 3 and communicates with the reference-gas inlet space 43. The pressure diffusion hole 75 is formed in order to alleviate increase in internal pressure due to increase in the temperature of the inside of the heater insulation layer 74.

Here, a distal end portion 101b refers to a portion of the sensor element body 101a in which a group of electrodes (the inner pump electrode 22, the outer pump electrode 23, the auxiliary pump electrode 51, and the measurement electrode 44) that are used to detect NOx by using the oxygen-ion conductivity of solid electrolyte layers (the third substrate layer 3, the first solid electrolyte layer 4, the spacer layer 5, and the second solid electrolyte layer 6) are provided. The distal end portion 101b is a portion that extends from a front end surface of the sensor element body 101a (surface including the gas inlet opening 10) to a predetermined position beyond the measurement electrode 44. The distal end portion 101b is covered by the porous protective layer 91.

The porous protective layer 91 covers the entirety of the front end surface of the sensor element body 101a, at which the gas inlet opening 10 is provided, and covers parts of the upper surface, the lower surface, the left side surface, and the right side surface of the sensor element body 101a, which are adjacently connected to the front end surface. The porous protective layer 91 also covers the outer pump electrode 23, which is provided on the upper surface of the sensor element body 101a. Therefore, the porous protective layer 91 suppresses adhesion of poisonous substances such as oil components included in the measurement-object gas and serves to suppress deterioration of the outer pump electrode 23. Although the porous protective layer 91 also covers the gas inlet opening 10, because the porous protective layer 91 is made of a porous material, the measurement-object gas can pass through the inside of the porous protective layer 91 and can reach the gas inlet opening 10. A peripheral edge 91a of the porous protective layer 91, which has a cup-like shape, is in close contact with the upper surface, the lower surface, the left side surface, and the right side surface of the sensor element body 101a with a buffer layer 91b therebetween. A spatial layer 93 is present between a portion of the porous protective layer 91 other than the peripheral edge 91a and the surface of the distal end portion 101b. The thickness of the spatial layer 93 is preferably 10 μm or more and 200 μm or less, and more preferably, 50 μm or more and 100 μm or less. The spatial layer 93 includes a first spatial layer 93a (see FIG. 4) provided between the porous protective layer 91 and the outer pump electrode 23. Preferably, the thickness variation of the first spatial layer 93a is 20% or less. Here, the thickness variation is variation in the thickness measured in a direction perpendicular to the upper surface of the sensor element body 101a. The porous protective layer 91 and the spatial layer 93 serve to suppress occurrence of cracking in the sensor element body 101a due to adhesion of water or the like in the measurement-object gas.

The porous protective layer 91 is made of a porous material that preferably includes, as constituent particles thereof, ceramic particles, and more preferably, particles of at least one of alumina, zirconia, spinel, cordierite, titania, and magnesia. In the present embodiment, the porous protective layer 91 is made of an alumina porous material. The porosity of the porous protective layer 91 is, for example, in the range of 5 vol % to 40 vol %. The porosity of the porous protective layer 91 may be 20 vol % or higher. The thickness of the porous protective layer 91 may be, for example, 100 µm or more or may be 300 µm or more. The thickness of the porous protective layer 91 may be, for example 500 µm or less or may be 400 µm or less. The maximum-height roughness Rz of a region 91f (see FIG. 4) of the inner surface of the porous protective layer 91 (surface on the sensor element body 101a side), the region 91f facing the outer pump electrode 23, is 50 µm or less (preferably, 40 µm or less). The maximum-height roughness Rz is a well-known parameter that is measured in accordance with FIG. 5. In FIG. 5, the reference length is a cut-off value of the roughness curve.

Next, a method of manufacturing the gas sensor 100 will be described. In the method of manufacturing the gas sensor 100, first, the sensor element body 101a is manufactured; next, the porous protective layer 91 is formed in the sensor element body 101a; and next the spatial layer 93 is formed, thereby manufacturing the sensor element 101.

A method of manufacturing the sensor element body 101a will be described. First, six ceramic green sheets are prepared. Then, patterns of electrodes, insulation layers, heaters, and the like are printed on the ceramic green sheets so as to correspond to the first substrate layer 1, the second substrate layer 2, the third substrate layer 3, the first solid electrolyte layer 4, the spacer layer 5, the second solid electrolyte layer 6. Next, the six ceramic green sheets in which the patterns of various types have been formed are stacked to form a stacked body. The stacked body is cut into small stacked bodies each having the size of the sensor element body 101a. On a region in each small stacked body in which the buffer layer 91b is to be formed, screen printing is performed by using a paste that includes the same material as the porous protective layer 91 (for example, an alumina paste when the material of the porous protective layer 91 is alumina). Subsequently, the small stacked body is fired at a predetermined firing temperature to obtain the sensor element body 101a. A portion on which the paste has been printed is co-fired with the ceramic sheet to become the buffer layer 91b. Therefore, the buffer layer 91b closely adheres to the surface of the sensor element body 101a. The buffer layer 91b can be formed as a porous layer by adding a pore-forming agent (organic binder or the like) to the paste. The buffer layer 91b can be formed, for example, in the same way as a coating layer described in JP 2016-65853 A. The surface of the distal end portion 101b of the sensor element body 101a is processed so as to have a maximum-height roughness Rz of 50 µm or less (preferably, 40 µm or less) by, as necessary, polishing the surface before forming the porous protective layer 91, if, for example, the surface maximum-height roughness Rz might become more than 50 µm.

Figure 6:
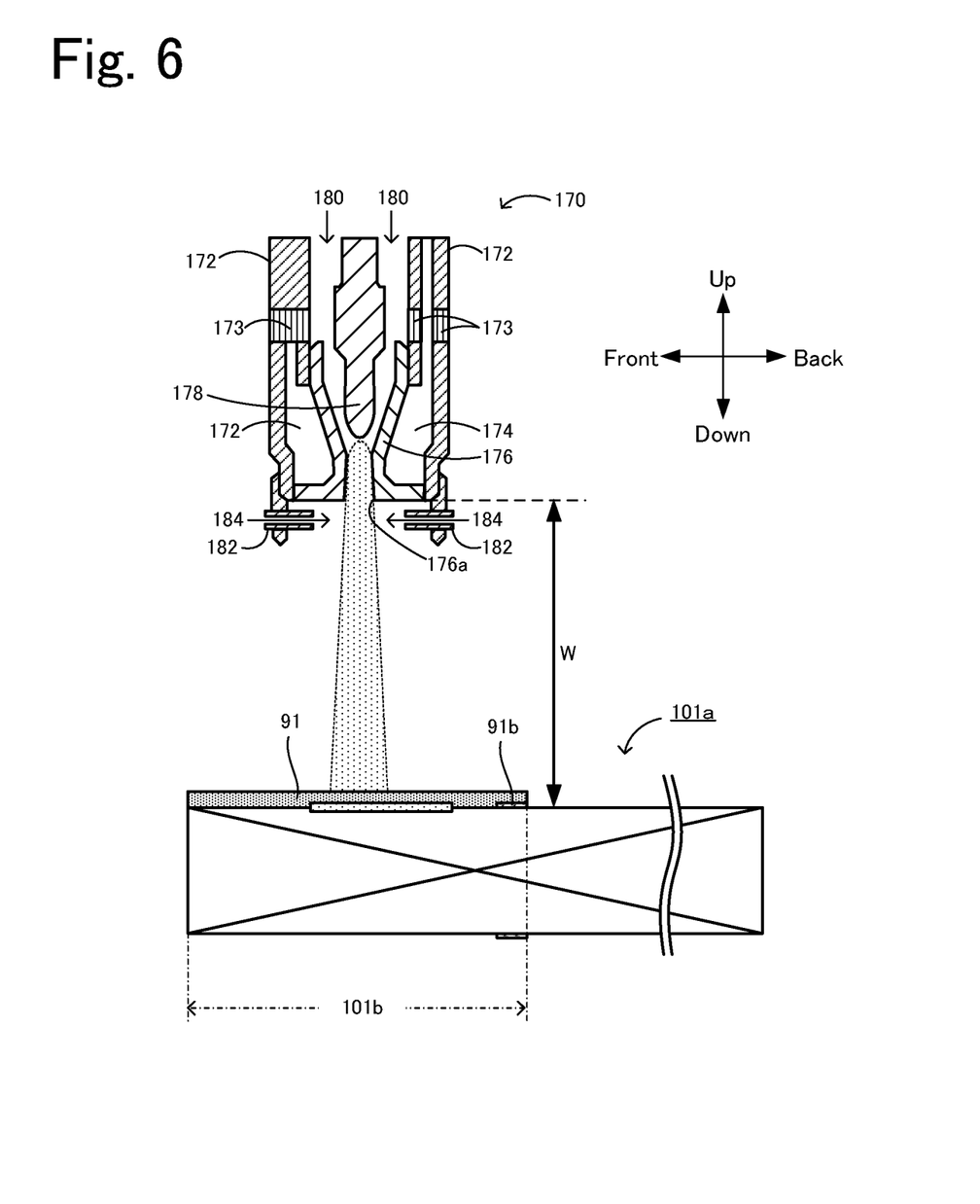
FIG. 6 illustrates plasma spraying using a plasma gun 170.

Next, a method of forming the porous protective layer 91 on the surface of the distal end portion 101b of the sensor element body 101a will be described. In the present embodiment, the porous protective layer 91 is formed by plasma spraying. FIG. 6 illustrates plasma spraying using a plasma gun 170. FIG. 6 illustrates an example of forming the porous protective layer 91 on the upper surface of the sensor element body 101a. In FIG. 6, the plasma gun 170 is shown as a cross-section thereof. The plasma gun 170 includes an anode 176 and a cathode 178, which are electrodes for generating plasma, and an outer peripheral portion 172 that covers these electrodes. The outer peripheral portion 172 includes an insulating portion (insulator) 173 for insulation from the anode 176. At a lower end of the outer peripheral portion 172, a powder supply portion 182 for supplying a powder spraying material 184 for forming the porous protective layer 91 is formed. A water-cooling jacket 174 is provided between the outer peripheral portion 172 and the anode 176, so that the anode 176 can be cooled. The anode 176 has a tubular shape and has a nozzle 176a that opens downward. A plasma generation gas 180 is supplied to a space between the anode 176 and the cathode 178.

When forming the porous protective layer 91, a voltage is applied between the anode 176 and the cathode 178 of the plasma gun 170 to cause arc discharge in the plasma generation gas 180 that is supplied, so that the plasma generation gas 180 enters a high-temperature plasma state. The gas in the plasma state is ejected from the nozzle 176a as a high-temperature high-speed plasma jet. From the powder supply portion 182, the powder spraying material 184 is supplied together with a carrier gas. Thus, the powder spraying material 184 is heated, melted, and accelerated by plasma, collides with the surface (upper surface) of the sensor element body 101a, and is rapidly solidified, thereby forming the porous protective layer 91.

As the plasma generation gas 180, for example, an inert gas such as argon gas can be used. In order to facilitate generation of plasma, preferably, a mixture of argon and hydrogen is used as the plasma generation gas 180. The flow rate of argon gas is, for example, in the range of 40 to 50 L/min, and the flow rate of hydrogen is, for example, in the range of 9 to 11 L/min. The voltage applied between the anode 176 and the cathode 178 is, for example, a direct current (DC) voltage in the range of 50 to 70 V, and the electric current is, for example, in the range of 500 to 550 A.

The powder spraying material 184, which is the powder material of the porous protective layer 91, is alumina powder in the present embodiment. The particle diameter of the powder spraying material 184 is, for example, in the range of 10 µm to 30 µm. As the carrier gas that is used to supply the powder spraying material 184, for example, argon gas that is the same as the plasma generation gas 180 can be used. The flow rate of the carrier gas is, for example, in the range of 3 to 4 L/min.

When performing plasma spraying, preferably, the distance W between the nozzle 176a, which is the outlet of plasma gas in the plasma gun 170, and a surface of the sensor element 101 on which the porous protective layer 91 is to be formed is in the range of 50 mm to 300 mm. The distance W may be in the range of 120 mm to 250 mm. In accordance with the area over which the porous protective layer 91 is to be formed, plasma spraying may be performed while appropriately moving the plasma gun 170. Also in this case, preferably, the distance W is maintained to be in the aforementioned range. The time for which plasma spraying is performed may be appropriately determined in accordance with the thickness and the area of the porous protective layer 91 to be formed. A region on which the porous protective layer 91 is not to be formed may be covered with a mask.

Figure 7:
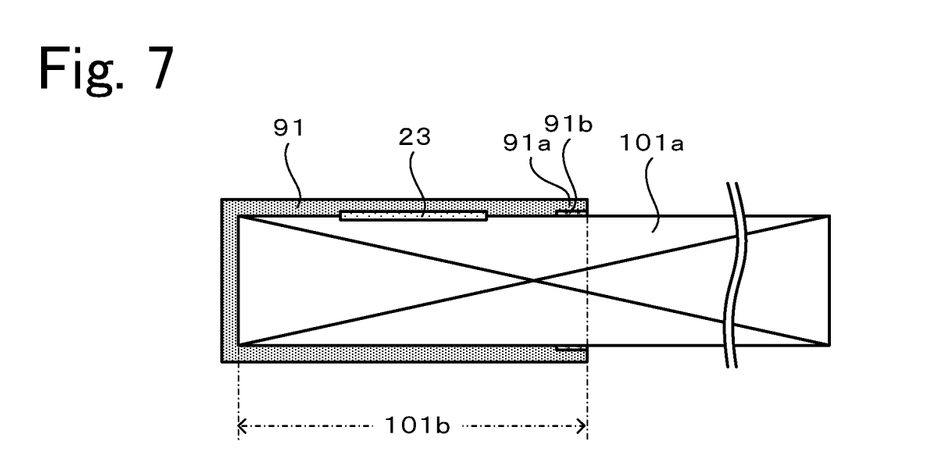
FIG. 7 is a sectional view illustrating a state immediately after a porous protective layer 91 has been formed on a sensor element body 101a by plasma spraying.
Figure 8:
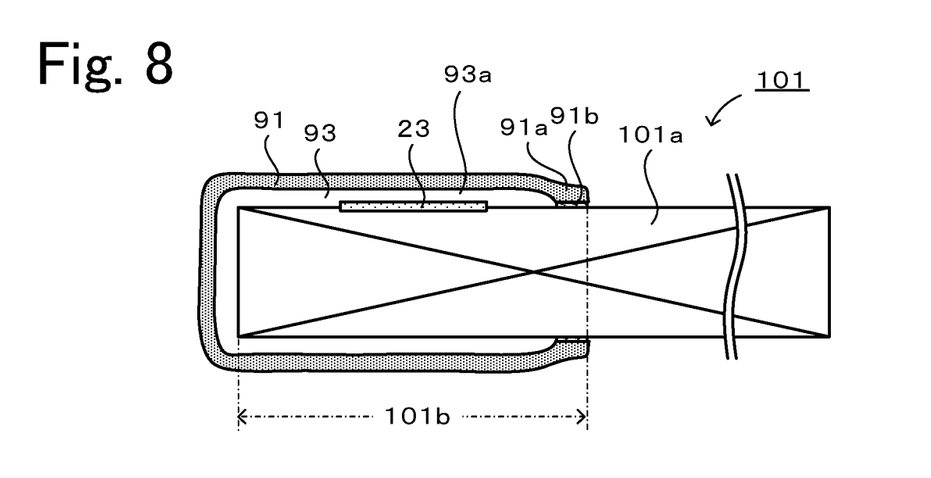

Immediately after the porous protective layer 91 has been made by plasma spraying, the entirety of the porous protective layer 91 closely adheres to the surface of the distal end portion 101b of the sensor element body 101a. FIG. 7 illustrates the sensor element 101 in this state. The peripheral edge 91a of the porous protective layer 91 overlaps the buffer layer 91b. The porous protective layer 91 is a porous alumina layer, while the solid electrolyte layers (the first to third substrate layers 1 to 3, the first and second solid electrolyte layers 4 and 6, and the spacer layer 5) of the sensor element body 101a are dense zirconia layers. Therefore, when the sensor element body 101a of FIG. 7 is heated to a temperature in the range of 950 to 1000° C., the porous protective layer 91 expands due to the thermal-expansion difference between the dense zirconia layers and the porous alumina layer, and the spatial layer 93 is formed between the porous protective layer 91 and the surface of the distal end portion 101b of the sensor element body 101a. The thickness of the spatial layer 93 can be adjusted, for example, by changing the heating temperature or by changing the porosity of the porous protective layer 91. FIG. 8 illustrates the sensor element 101 in this state. Even after being heated, the peripheral edge 91a of the porous protective layer 91 firmly and closely adheres to the surface of the sensor element body 101a with the buffer layer 91b therebetween. The inner surface of the porous protective layer 91 is in a state in which the surface of the sensor element body 101a has been substantially copied to the inner surface. As necessary, by setting the maximum-height roughness Rz of the surface of the sensor element body 101a at 50 μm or less (preferably, 40 μm or less) before plasma spraying the porous protective layer 91, the maximum-height roughness Rz of the inner surface of the porous protective layer 91 also becomes 50 μm or less (preferably, 40 μm or less). Thus, the sensor element 101 is obtained.

When the sensor element 101 is obtained, the sensor element 101 is inserted through the supporter 124 and the compact 126; the sensor element 101, the supporter 124, and the compact 126 are inserted into the through-hole in the metal shell 122 from an upper side in FIG. 1; and the sensor element 101 is fixed by using the element sealing member 120. Then, the nut 130, the protective cover 110, and the like are attached, thereby obtaining the gas sensor 100.

When the gas sensor 100 configured as described above is used, a measurement-object gas in the pipe 140 flows into the protective cover 110, reaches the sensor element 101, passes through the porous protective layer 91, and flows into the gas inlet opening 10. Then, the sensor element 101 detects the NOx concentration in the measurement-object gas that has flowed into the gas inlet opening 10. At this time, water included in the measurement-object gas may also enter the inside of the protective cover 110 and may adhere to the surface of the porous protective layer 91. As described above, the temperature of the sensor element body 101a is adjusted by the heater 72 at a temperature (for example, 800° C.) at which the solid electrolyte is activated. Therefore, when water adheres to the sensor element 101, the temperature may sharply decrease and cracking may occur in the sensor element body 101a. However, in the present embodiment, because heat conduction in the thickness direction of the porous protective layer 91 is impeded by the spatial layer 93, cooling of the sensor element body 101a when water adheres to the surface of the porous protective layer 91 is suppressed. Moreover, the maximum-height roughness Rz of a region of the inner surface of the porous protective layer 91, the region facing the outer pump electrode 23, is 50 μm or less (preferably, 40 μm or less), and the region is a smooth surface. Therefore, heat radiated from the sensor element body 101a is reflected by the inner surface of the porous protective layer 91 and easily returns to the sensor element body 101a, and high temperature-maintaining effect can be obtained.

With the sensor element 101 according to the present embodiment described above, high temperature-maintaining effect can be obtained for the following reasons: cooling of the sensor element body 101a when water adheres to the surface of the porous protective layer 91 is suppressed as described above; and, in addition, heat that is radiated from the sensor element body 101a is reflected by the inner surface of the porous protective layer 91 and easily returns to the sensor element body 101a. Accordingly, the water resistance of the sensor element 101 is improved.

Preferably, the thickness variation of the first spatial layer 93a of the spatial layer 93 is 20% or less. Although the heat-insulating ability of the first spatial layer 93a is dependent on the thickness of the first spatial layer 93a, heat-insulating ability does not considerably differ between a thick part and a thin part of the first spatial layer 93a, provided that the thickness variation is 20% or less.

Moreover, the porous protective layer 91 covers, with the spatial layer 93 therebetween, the surface of the distal end portion 101b of the sensor element body 101a in which a group of electrodes (including the outer pump electrode 23) that are used to detect a NOx component by utilizing the oxygen-ion conductivity of the solid electrolyte layers are provided. Therefore, the water resistance of the distal end portion 101b, which performs an important function in detection of a NOx component, is improved.

The present invention is not limited to the embodiment described above, and may be carried out in any aspects within the technological scope of the present invention.

For example, in the embodiment described above, the porous protective layer 91 covers the entirety of the front end surface of the sensor element body 101a, at which the gas inlet opening 10 is provided, and covers parts of the upper surface, the lower surface, the left side surface, and the right side surface of the sensor element body 101a, which are adjacently connected to the front end surface. However, the porous protective layer 91 is not limited to such a layer. For example, the porous protective layer 91 may be provided only on the upper surface of the sensor element body 101a so as to cover the outer pump electrode 23, and a spatial layer (first spatial layer) may be formed between the porous protective layer 91 and the outer pump electrode 23. If there is a portion that tends to have a high temperature more easily than the outer pump electrode 23, the porous protective layer 91 may be provided so as to cover the portion, and a spatial layer (first spatial layer) may be formed between the portion and the porous protective layer 91.

In the embodiment described above, the spatial layer 93 (including the first spatial layer 93a) is provided between the porous protective layer 91 and the surface of the sensor element body 101a. In a region of the spatial layer 93 other than the first spatial layer 93a, the entirety or a part of the porous protective layer 91 may be connected to the surface of the sensor element body 101a.

Figure 9:
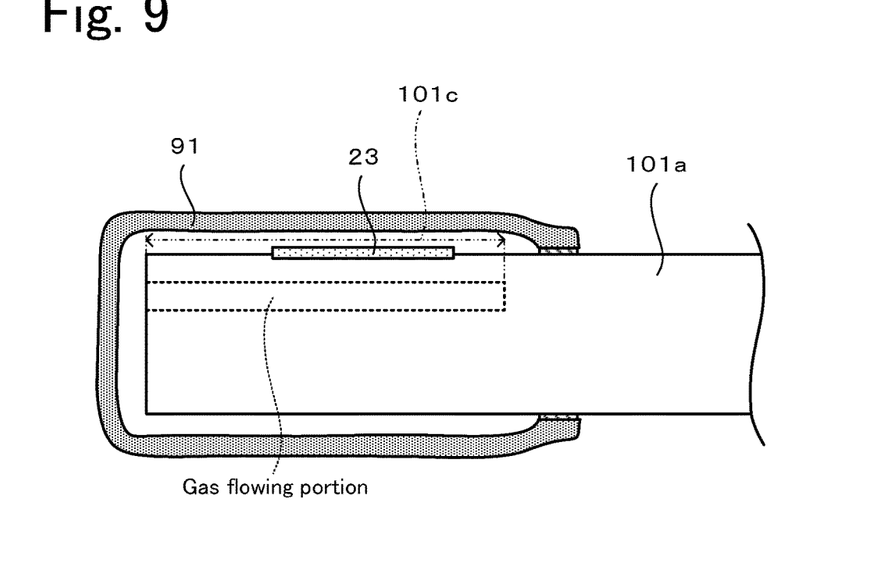

In the embodiment described above, the outer pump electrode 23 is a predetermined portion in the present invention. As illustrated in FIG. 9, a portion 101c (including the first the outer pump electrode 23) that is a projection of the gas flowing portion onto the upper surface of the sensor element body 101a may be a predetermined portion according to the present invention. In this case, a space between the porous protective layer 91 and the portion 101c is a first spatial layer. A region of the inner surface of the porous protective layer 91, the region facing the portion 101c, has a maximum-height roughness Rz of 50 μm or less (preferably, 40 μm or less).

In the embodiment described above, the porous protective layer 91 is formed by plasma spraying. However, this is not a limitation. For example, the porous protective layer 91 may be formed by using another spraying method, such as high-speed frame spraying, arc spraying, or laser spraying.

Figure 10:
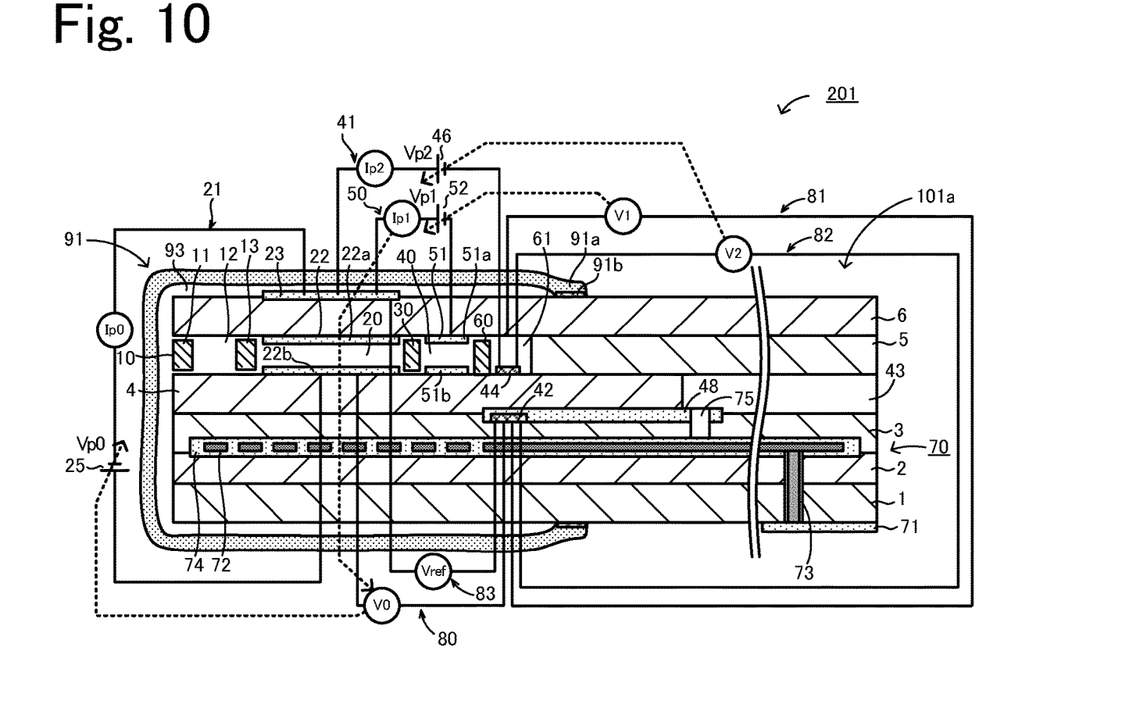
FIG. 10 is a sectional view of a sensor element 201.

In the embodiment described above, the sensor element 101 of the gas sensor 100 has the measurement electrode 44 that is in the second internal space 40 and that is covered with the fourth diffusion-rate-determining portion 45. However, the configuration of the sensor element 101 is not particularly limited to this configuration. For example, as in a sensor element 201 illustrated in FIG. 10, the measurement electrode 44 need not be covered but may be exposed, and a fourth diffusion-rate-determining portion 60 having a slit-like shape, may be provided between the measurement electrode 44 and the auxiliary pump electrode 51. The fourth diffusion-rate-determining portion 60 provides a predetermined diffusion resistance to the measurement-object gas, whose oxygen concentration (oxygen partial pressure) has been controlled in the second internal space 40 as the auxiliary pump cell 50 operates, and guides the measurement-object gas further into a third internal space 61. The fourth diffusion-rate-determining portion 60 performs a function of limiting the amount of NOx that flows into the third internal space 61. Also with the sensor element 201 having such a configuration, in the same way as in the embodiment described above, NOx concentration can be detected by using the measurement pump cell 41. Elements in FIG. 10 that are the same as those in FIG. 3 are denoted by the same numerals.

In the embodiment described above, the gas sensor 100 that detects NOx concentration is described as an example. However, the present invention may be applied to a gas sensor that detects oxygen concentration or a gas sensor that detects ammonia concentration.

EXAMPLES

Hereafter, examples of sensor elements that were actually made will be described. Examples 1 to 5 correspond to examples of the present invention, and Examples 6 to 9 correspond to comparative examples. Note that the present invention is not limited to the examples described below.

Experimental Example 1

In accordance with the method of manufacturing the sensor element 101 according to the embodiment described above, by firing a small stacked body in which a plurality of ceramic green sheets were stacked and on which a paste for forming the buffer layer 91b was applied, the sensor element 101 illustrated in FIGS. 2 and 3 was made. To be specific, first, the sensor element body 101a having a length of 67.5 mm in the front-back direction, a width of 4.25 mm in the left-right direction, and a thickness of 1.45 mm in the up-down direction was made. In making the sensor element body 101a, the ceramic green sheets were formed by mixing zirconia particles, to which yttria had been added by 4 mol % as a stabilizing agent, an organic binder, and an organic solvent; and by performing tape forming. The paste for forming the buffer layer 91b was prepared as follows. First, as raw material powder, alumina powder having a particle diameter D50=5 μm was prepared. Then, the paste was prepared by mixing alumina powder in 10 vol %, a binder solution (polyvinylacetal and butyl carbitol) in 40 vol %, a co-solvent (acetone) in 45 vol %, and a dispersant (polyoxyethylene styrenated phenyl ether) in 5 vol %; and by mixing the mixture in a pot-mill mixer with a rotation speed of 200 rpm for three hours.

Next, processing was performed so that the maximum-height roughness Rz of the surface of the sensor element body 101a became 15 μm, and then the porous protective layer 91 was formed. Plasma spraying for forming the porous protective layer 91 was performed under the following conditions. As the plasma generation gas 180, a mixture of argon gas (flow rate of 50 L/min) and hydrogen (flow rate 10 L/min) was used. A direct current (DC) voltage of 70 V was applied between the anode 176 and the cathode 178. The electric current was 500 A. As the powder spraying material 184, alumina powder having a particle diameter distribution in the range of 10 μm to 30 μm was used. Argon gas (flow rate of 4 L/min) was used as a carrier gas for supplying the powder spraying material 184. The distance W was 150 mm. Plasma spraying was performed in a room-temperature air environment. The spraying direction of the plasma gun 170 (the direction of the nozzle 176a) was perpendicular to the surface of the sensor element 101 on which the porous protective layer 91 was to be formed. The porous protective layer 91 that was formed had a thickness of about 300 μm and a porosity of about 20%.

Lastly, the sensor element body 101a, in which the porous protective layer 91 had been formed, was heated for one hour at a temperature in the range of 950 to 1000° C. to form the spatial layer 93, thereby obtaining the sensor element 101 of Example 1. The maximum-height roughness Rz of a region of the inner surface of the porous protective layer 91, the region facing the outer pump electrode 23, was 15 μm. This was substantially the same as the maximum-height roughness Rz of the surface of the sensor element body 101a. The average thickness of the spatial layer 93 was 50 μm, and the thickness variation of the spatial layer 93 was 9%.

Experimental Examples 2 to 5

In each of Examples 2 to 5, the sensor element 101 was made in the same way as in Example 1, except that the maximum-height roughness Rz of the sensor element body 101a before plasma spraying the porous protective layer 91 was changed in the range of 20 to 40 μm. For the sensor element 101 of each of Examples 2 to 5 that was obtained, the maximum-height roughness Rz of a region of the inner surface of the porous protective layer 91, the region facing the outer pump electrode 23, and the variation in the thickness of the first spatial layer 93a of the spatial layer 93, the first spatial layer 93a facing the outer pump electrode 23, were measured. The results are shown in Table 1. In Examples 2 to 5, the average thickness of the spatial layer 93 was adjusted to 50 μm.

Experimental Examples 6 to 9

In Examples 1 to 5, the spatial layer 93 was formed by using thermal-expansion difference. In Examples 6 to 9, the spatial layer 93 was formed as follows: before plasma spraying the porous protective layer 91, a vanishing material having the same shape as the spatial layer 93 was applied by dipping; subsequently the porous protective layer 91 was formed by spraying; and the vanishing material was caused to vanish by heating the vanishing material to 600° C. Here, theobromine was use as the vanishing material. Spraying conditions were the same as in Example 1. For the sensor element 101 of each of Examples 6 to 9 that was obtained, the maximum-height roughness Rz of a region of the inner surface of the porous protective layer 91, the region facing the outer pump electrode 23, and the variation in the thickness of the first spatial layer 93a of the spatial layer 93, the first spatial layer 93a facing the outer pump electrode 23, were measured. The results are shown in Table 1. In Examples 6 to 9, the average thickness of the spatial layer 93 was adjusted to 50 μm.

[Evaluation of Water Resistance]

For the sensor element of each of Examples 1 to 9, the ability of the porous protective layer 91 (the water resistance of the sensor element 101) was evaluated. To be specific, first, electricity was supplied to the heater 72 to increase the temperature of the heater 72 to 800° C., so that the sensor element 101 was heated. In this state, the main pump cell 21, the auxiliary pump cell 50, the oxygen-partial-pressure sensor cell 80 for main pump control, the oxygen-partial-pressure sensor cell 81 for auxiliary pump control, and the like were operated in atmospheric air, so that the oxygen concentration in the first internal space 20 was controlled to be maintained at a predetermined constant value. Then, after waiting until the pump electric current Ip0 stabilized, water droplets were dropped onto the porous protective layer 91, and whether cracking occurred in the sensor element 101 was determined on the basis of whether the pump electric current Ip0 changed to a value exceeding a predetermined threshold. If cracking occurs in the sensor element 101 due to thermal shock caused by water droplets, oxygen easily flows into the first internal space 20 through the cracked part, and, as a result, the value of the pump electric current Ip0 increases. Therefore, in a case where the pump electric current Ip0 exceeded a predetermined threshold obtained by experiment, it was determined that cracking occurred in the sensor element 101 due to water droplets. The amounts of water droplets were 8 µL and 12 µL. The results are shown in Table 1.

TABLE 1

| Experimental Examples | Maximum-height roughness Rz of a region of an inner surface of the porous protective layer [µm] | Variation of the spatial layer [%] | Cracking when the amount of water droplets was 8 µL | Cracking when the amount of water droplets was 12 µL |
| --- | --- | --- | --- | --- |
| 1 | 15 | 9 | ○ | ○ |
| 2 | 20 | 18 | ○ | ○ |
| 3 | 25 | 17 | ○ | ○ |
| 4 | 30 | 13 | ○ | ○ |
| 5 | 40 | 25 | ○ | x |
| 6 | 60 | 29 | x | x |
| 7 | 75 | 22 | x | x |
| 8 | 100 | 35 | x | x |
| 9 | 125 | 38 | x | x |

As can be seen from Table 1, in Examples 1 to 5, because the maximum-height roughness Rz of a region of the inner surface of the porous protective layer 91, the region facing the outer pump electrode 23, was 50 µm or less (to be specific, in the range of 15 to 40 µm), cracking did not occur in a water-resistance evaluation test in which the amount of water droplets was 8 µL. One reason is considered as follows: because heat conduction in the thickness direction of the porous protective layer 91 was impeded by the spatial layer 93, cooling of the sensor element body 101a when water adhered to the surface of the porous protective layer 91 was suppressed. Another reason is considered as follows: although the outer pump electrode 23 tends to have a high temperature during use, because the region 91f of the inner surface of the porous protective layer 91, the region 91f facing the outer pump electrode 23, was a smooth surface, heat radiated from the sensor element body 101a was reflected by the inner surface of the porous protective layer 91 and easily returned to the sensor element body 101a, and high temperature-maintaining effect was obtained. In particular, in Examples 1 to 4, because the thickness variation of the first spatial layer 93a between the porous protective layer 91 and the outer pump electrode 23 was 20% or less, cracking did not occur also in the water-resistance evaluation test in which the amount of water droplets was 12 µL.

In contrast, in Examples 6 to 9, because the maximum-height roughness Rz of a region of the inner surface of the porous protective layer 91, the region facing the outer pump electrode 23, was more than 50 µm (to be specific, in the range of 60 to 125 µm) and large, cracking occurred in each of the water resistance evaluation tests in which the amounts of water droplets were 8 µL and 12 µL. The reason is considered as follows: when the maximum-height roughness of the region 91f of the inner surface of the porous protective layer 91, the region 91f facing the outer pump electrode 23, exceeded 50 µm, the surface area of the region 91f increased, and therefore heat radiated from the sensor element body 101a was absorbed by the porous protective layer 91 and the heat did not easily return to the sensor element body 101a. Therefore, the temperature-maintaining effect of the sensor element body 101a was not sufficiently obtained, and cracking occurred. In Examples 6 to 9, the maximum-height roughness Rz was large. One reason for this is because high temperature powder entered into a vanishing material layer, which had been applied to the surface of the sensor element body 101a, when the porous protective layer 91 was plasma sprayed, and the interface between the vanishing material layer and the porous protective layer 91 became irregular.

What is claimed is:

1. A gas sensor element for detecting a concentration of a predetermined component in a gas, the gas sensor element comprising:
    an element body including a solid electrolyte layer having oxygen-ion conductivity;
    a predetermined portion that is a portion at a surface of the element body at a predetermined temperature;
    a porous protective layer that is provided so as to cover at least the predetermined portion; and
    a first spatial layer that is provided between the porous protective layer and the predetermined portion,
    wherein a maximum-height roughness Rz of a region of an inner surface of the porous protective layer, the region facing the predetermined portion, is 50 µm or less,
    wherein the porous protective layer is provided so as to cover a surface of a distal end portion, and
    wherein a spatial layer including the first spatial layer is present between the porous protective layer and the surface of the distal end portion including a front end of the distal end portion.

2. The gas sensor element according to claim 1,
    wherein the maximum-height roughness Rz of the region of the inner surface of the porous protective layer, the region facing the predetermined portion, is 40 µm or less.

3. The gas sensor element according to claim 1,
    wherein a thickness variation of the first spatial layer is 20% or less.

4. The gas sensor element according to claim 1,
    wherein the solid electrolyte layer is a zirconia layer, and
    wherein the porous protective layer is a porous alumina layer.

5. The gas sensor element according to claim 1,
    wherein the predetermined portion is an outer electrode that is one of a group of electrodes that are used to detect the predetermined component by using the oxygen-ion conductivity of the solid electrolyte layer.

6. The gas sensor element according to claim 5,
wherein the element body has an elongated rectangular-parallelepiped shape, and
wherein the group of electrodes are provided in the distal end portion of the element body, the distal end portion including an end surface of the element body in a longitudinal direction.

7. The gas sensor element according to claim 1,
wherein the predetermined portion is a portion that is a projection of a gas flowing portion onto the surface of the element body, the gas flowing portion being a space through which the gas is taken into the element body from an outside space.

8. A gas sensor comprising: the gas sensor element according to claim 1.

* * * * *